(12) United States Patent
Dressler

(10) Patent No.: US 9,938,438 B2
(45) Date of Patent: Apr. 10, 2018

(54) ULTRA LOW TEMPERATURE MOUNTING BOARD

(71) Applicant: The Gilman Brothers Company, Gilman, CT (US)

(72) Inventor: Donald R. Dressler, Glastonbury, CT (US)

(73) Assignee: The Gilman Brothers Company, Gilman, CT (US)

( * ) Notice: Subject to any disclaimer, the term of this patent is extended or adjusted under 35 U.S.C. 154(b) by 747 days.

(21) Appl. No.: 14/257,381

(22) Filed: Apr. 21, 2014

(65) Prior Publication Data

US 2015/0299539 A1    Oct. 22, 2015

(51) Int. Cl.
| | |
|---|---|
| *C09J 175/04* | (2006.01) |
| *B32B 37/06* | (2006.01) |
| *C09J 131/04* | (2006.01) |
| *B32B 37/12* | (2006.01) |
| *B32B 38/04* | (2006.01) |
| *B32B 38/10* | (2006.01) |
| *B32B 37/00* | (2006.01) |
| *B32B 37/10* | (2006.01) |
| *B32B 37/20* | (2006.01) |

(52) U.S. Cl.
CPC ............ *C09J 175/04* (2013.01); *B32B 37/06* (2013.01); *C09J 131/04* (2013.01); *B32B 37/003* (2013.01); *B32B 37/1018* (2013.01); *B32B 37/1207* (2013.01); *B32B 37/1284* (2013.01); *B32B 37/20* (2013.01); *B32B 38/04* (2013.01); *B32B 38/10* (2013.01); *B32B 2038/047* (2013.01); *B32B 2305/022* (2013.01); *B32B 2305/026* (2013.01); *B32B 2309/02* (2013.01); *B32B 2309/14* (2013.01); *B32B 2317/12* (2013.01)

(58) Field of Classification Search
CPC .... C09J 175/04; C09J 131/04; B32B 37/1207
See application file for complete search history.

(56) References Cited

U.S. PATENT DOCUMENTS 5,837,089 A * 11/1998 Magrum ............. B32B 37/1207
156/275.5

* cited by examiner

*Primary Examiner* — Carson Gross
(74) *Attorney, Agent, or Firm* — Alix, Yale & Ristas, LLP

(57) ABSTRACT

A heat activatable adhesive and associated method of use, suitable for permanently bonding any kind of display graphic to any mounting substrate at a temperature setting of 110-130 F in a roll or vacuum press laminator. The preferred adhesive is a combination of polyvinyl acetate ethylene emulsion (VAE) and polyurethane dispersions (PUD), each with very different bonding attributes when considered alone. When the adhesive is on a smooth mounting surface such as a coated foam board or the like for bonding against a smooth coated surface of display item, a multiplicity of micro perforations are provided through the adhesive whereby air between the opposed smooth surfaces can escape into the foam board during lamination. Other aspects include a process for manufacturing a foam board for mounting display items, having a perforated adhesive layer.

15 Claims, 2 Drawing Sheets

ULTRA LOW TEMPERATURE MOUNTING BOARD

BACKGROUND

This invention relates to the mounting of photographs, posters, digital ink jet prints, and fabrics to a rigid board for display purposes in the picture framing, sign and display markets. These types of boards are commonly known as heat activated foam boards, or HA boards.

One of these kinds of display items can be placed on the heat activated adhesive on the board and sent through a heated roll laminator or a flat press using heat and pressure created from either a mechanical system or a vacuum mechanism.

For many decades various means to adhesively attach display items to a foam board have been employed. Prior to boards having a direct coating of adhesive on one side of the board there were adhesive coated papers or free adhesive films known in the art as dry mount tissues used to adhere items such as photographs to a composite foam board. These adhesive tissues are still used today and present various problems with their application. These tissues are coated on light weight paper (20#) and have lay flat issues due to moisture absorption and coating methods. Having to cut to size these adhesive tissues is quite timely and creates greater risk of air entrapment during mounting now that there are three separate items to bond together.

Entrapped air causes visible bubbles and additionally, dirt particles picked up from manufacturing or storage show up in the final mount as bumps and generate major complaints from customers. The challenge is how to keep the adhesive surface clean and eliminate air bubbles. Many attempts over the years have not eliminated this problem.

Most of these tissues require high temperatures to initiate a bond to the foam board and the item to be mounted. The most popular tissue being sold today goes under the trade name Colormount. This product from D&K Group Inc. has a recommended application temperature of 175-205 F. At these temperatures many photographs and other heat sensitive items will be negatively affected. The foam of the board itself will also begin to change its physical appearance at these temperatures. When using dry mount tissues it is also recommended by these suppliers that one buys their heavy metal plate to place the still hot mounted board with the newly mounted item under the weight of the plate to allow the package to cool so the corners of the photographs or display items will not lift off the warm adhesive. These tissues are rather costly with some in the 0.45 cents per square foot range.

A few years after the introduction of dry mount adhesive tissues manufacturers began to direct coat a heat activated adhesive one side of the foam board to replace the dry mount tissue. New equipment in the format of hot roll laminators became popular for the laminating and mounting of these boards due to their small physical footprint in a shop and their speed. The traditional small format mechanical press and the larger vacuum press were the main equipment used in the industry for mounting and laminating for many decades but had job size limitations and were slow in production.

The most widely used coated board in the market is Encore Single Step by Elmers Products, with a recommended application temperature of 180 F. This temperature is too hot for both the foam center core and many items that may needed to be mounted. This mounting board and many others do not have universal adhesion to all the types of items that may need to be mounted. The Elmers Single Step product literature includes a disclaimer that this product is not recommended for RC (resin coated) photo papers, a very important type of item for mounting. Some companies have come out in the market with low temperature coated foam board in the range of 160 F to get around the issue of excessive heat creating cosmetic defects for the foam, photographs and other mounting items. It appears the lowered application temperature of the adhesive also decreases the hot tack, with the consequence that the ultimate bond is decreased and corners frequently lift off the board immediately after mounting.

Another problem with the lower activation adhesive coated boards when used with a hot roll laminator for mounting is adhesive transfer. It is customary when sending a job through the laminator some of the top adhesive layer is exposed and not covered up by the poster or mounting item and this adhesive will come into direct contact with the heated silicon rubber roll and transfer to the roll. Because silicon rubber is release material the roll transfers the adhesive onto the surface of the next job and renders it unacceptable.

There are two basic methods for getting the adhesive on the foam board products surface. The adhesive may be extruded from pellets with products like EVA or EMA resins into a smooth adhesive coating on the foam board surface or they may be water based dispersions of PVA coated and dried onto the foam board surface. Current water based PVA products have a very pronounced coating pattern evident on the dried adhesive, which looks like roll splatter. This is evident in the mounted print surface, reducing the quality of the final product. Current EVA extruded coatings on boards are smooth but have the drawbacks of adhesive transfer to the hot laminating rolls and insufficiently low activation temperature to avoid all the heat-related problems discussed above.

It must be noted that trying to lower the melting points or activation temperature of the EVA adhesives also makes them transfer more to the hot rubber laminator rolls. So conventional thinking in this industry is that extruded EVA cannot provide a total solution.

It must also be noted that a desired smooth surface adhesive coated board will result in air bubbles and ruined jobs when used in a heated vacuum or mechanical platen press due to a non-porous item (i.e., resin coated photo paper) mounted to a non-porous coated board. The air between the item to be mounted and the board cannot all be displaced simultaneously over a large surface areas, and cannot pass through the mating surfaces, so entrapment of some air is inevitable. The aqueous coated PVA boards rely on the coating roll texture to help create a rough surface on the adhesive that provides air channels for entrapped air to escape during the mounting process. As mentioned above this solution to air bubble entrapment exhibits the drawback of undesirable surface texture in the final product.

In a production environment, "time is money", and it is therefore critical how long it takes to send a board through a hot roll laminator or heated vacuum press. Roll laminators are quicker and take up less floor space and can handle larger format pieces than either the mechanical press or the vacuum press. Industry standards for the vacuum and mechanical press are on average 2-3 minutes duration at a temperature of 160 F-180 F for good adhesion to the adhesive coated board. The speed for the hot roll laminator for Elmers Single Step, a very popular heat activated product, is 3 feet per minute at a roll temperature setting of 250

F. Three feet per minute is considered a fast speed in this industry and at faster speeds adhesion suffers.

It can thus be appreciated that the objective in the HA foam board mounting industry is to produce quality mounting using the lowest temperature at the highest speed.

This wish list was partially addressed with the introduction of pressure sensitive adhesive (PSA) coated boards taking the heat out of the mounting process with a cold seal through a cold roll laminator. Certainly taking the temperature out of the lamination makes for less wrinkling of the materials to be mounted, since heated rolls drive moisture out of paper based items and heat distorts plastic mounting items. However a new set of issues become evident with these PSA boards. When the release liner is removed, the adhesive surface is very tacky and aggressive requires a great deal of care so as to not let anything touch the surface before the board is fed to the laminator. Although the adhesive bond may look good there are some risks that over time a bond can let go from the adhesive due to moisture absorption and paper mounted items changing in dimension and exhibiting bumps and ridges between the foam board and mounted items such as posters or photos.

PSA boards are not considered as providing as good a bond to some mounted items as heat activated boards. PSA boards are often used with photographs even though it is much more difficult to master the mechanics of the process when compared to a heat activated process. Many of the heat activated boards will not bond to the difficult photo papers and the paper's chemistry is affected by heat in a detrimental manner so the fall-back option, although a challenging one, has been to use a PSA coated board for this application.

It is quite evident that although many types of equipment and foam boards have been used in this industry for decades, no universal solution has been found to overcome the problems of slow process throughput, high temperature, and surface irregularity in the final product.

SUMMARY OF THE INVENTION

These problems prompted the discovery of a new heat activatable adhesive that can permanently bond any kind of display graphic to any substrate at a remarkably low temperature setting of 110-130 F in a roll or vacuum press laminator.

This adhesive is especially effective for use in a heat activated adhesive foam board that overcomes all the foregoing problems when used with any type of mounting equipment.

Addressing these problems also led to the discovery of a technique for eliminating air pockets and similar defects during lamination, especially when mounting resin coated graphic displays.

The main objective is to mount a display item to a rigid board, such as a foam board having a foam core and hard paper or plastic facers on both sides. One does not want the foam, the papers, the plastic, the heat activated adhesive, or the process to laminate them together to impact or change the aesthetics of the mounted item, e.g., air bubbles, small pits, bumps, undesirable texture, bowing of the board, or mottling of the surface (change in gloss). The new mounting board has been proven to resolve all the aforementioned industry problems associated with the mounting process.

One aspect of the invention is a new adhesive that exhibits very low melt temperature, aggressive adhesion with strong hot tack, and low propensity to melt and transfer to a hot laminator rubber roll. Preferably, the adhesive is a combination of polyvinyl acetate ethylene emulsion (VAE) and polyurethane dispersions (PUD), each with very different graphics bonding attributes when considered alone with different attributes.

Another aspect of the invention is providing air flow paths whereby air between opposed smooth surfaces such as resin coated paper of a display item and a smooth adhesive on the foam board, can escape into the foam board. The facing sheet with adhesive layer and release liner are microperforated prior to being laminated in line onto the base foam board. This aspect is applicable to any type of adhesive coating on a foam board.

Yet another aspect is a process for manufacturing a foam board for mounting display items.

A final aspect is a method for laminating any graphics display on any mounting surface at a temperature setting of only 110-130 on the laminator.

The important features of the preferred embodiment include:
  Lowest sealing temperatures at 130 F
  Broad temperature range at 130-300 F
  Very high hot tack that keeps edges bonded
  Attached release liner keeps adhesive surface clean
  Glass-smooth adhesive surface avoids texturing on display item
  Fast mounting at >6 fpm on roll laminator; 1 min. on vacuum press; 10 sec. on mechanical press
  Adhesive will not transfer to laminator roll or press
  Universal mounting of RC photo papers, ink jet papers, polyester films, posters, and fabrics The following summary further explains the features and advantages:

(1) Temperature

This new adhesive board will bond to all mounting items at a temperature of 130 F in a mechanical or vacuum press. This compares to the present industry product range of 160 F-180 F. Although some industry product advertises temperatures as low as 150 F that temperature is for mounting very thin select papers and not for all desired mounting items and not close to the low temperature and universal properties of the new board.

This new adhesive board will bond to mounting items through a hot roll laminator at temperatures as low as 180 F at 2-6 feet per minute. This compares to the present industry product range of 225 F-250 F at 2-3 feet per minute. The temperatures are higher for these roll laminators due to the lack of dwell time going through heated nip rolls at 2-6 feet per minute compared to a heated press with dwell times of 10-30 seconds.

It must be appreciated that the new invention has a very broad temperature window for successful mounting between 130 F-300 F with much faster mounting times in either press or roll laminators than any present available product in the marketplace.

This low temperature range is effective at conventional pressures associated with roll laminators and presses, e.g., about 10-20 psi.

(2) Speed

This new adhesive board will bond to mounting items in a mechanical press or vacuum press with a time range of 10 seconds (mechanical) to 1 minute (vacuum). This compares to the present industry product times of 2-3 minutes.

Most mounting boards in the industry are being used by hot roll laminating equipment. A heated silicone nip roll with a gap adjustment to accommodate various thickness materials drives the board with the mounted item on the adhesive surface between the two silicone rolls to use heat and pressure to adhere the items together. Using an industry standard Titan laminator from General Binding Corp. (GBC) set at 250 F (nip roll temperature) and a speed of 5 feet per minute Elmers Single Step board (the industry standard) failed to mount any of the standard test items consisting of Kodak professional RC photo paper, Hewlett Packard gloss photo ink jet paper, and Hewlett Packard heavy matte presentation paper. The new board on the Titan laminator at 250 F at 5 feet per minute had excellent bonds on all three test papers.

When the Titan nip roll temperature was lowered to 200 F at 5 feet per minute, the Single Step failed on all test papers mentioned above and the new board had good adhesion on all test papers. Roll temperatures as low as 175 F provided for good bonds at speeds of 2-6 Feet per minute on the new ultra low temperature adhesive board. The industry standard adhesive boards will not bond at these low temperatures and line speeds. One can readily appreciate the major improvement in productivity (higher speed) and quality appearance (no temperature impact) by using this new very low temperature adhesive board product.

(3) Hot Tack

Hot tack as defined in this application is the ability of a mounting item to stay mounted with no tendency to peel up or away from the adhesive board when processed through the heated equipment and upon emerging is still hot or warm. This tack or grab while hot is a critical feature of this new product. Many industry products now recommend placing the hot mounted board under a weight or find a way to keep pressure on the board until it cools so the mounted items will not start to pop off at the edges. This is a very slow, time consuming operation and not practical. Because the invention has a great deal of hot tack this extra procedure is not needed. The combination of low temperature seal and high hot tack has not been achieved before the development of this new board. This inventive product will seal at 130 F and be resistant to mounted item edge peel at up to 200 F. There are no products in the industry presently that have been able to accomplish this unusual opposing thermal dynamic duality with one adhesive coated board. The largest company in this market, Elmers Products, has two heat activated mounting boards: Single Step high heat activation temperature (as given in the Single Step instruction sheet packaged with the product) activates at 180 F with some hot tack and Step 150 activates at 150 F with very poor hot tack.

(4) Cosmetics

The reason to mount a piece of art, poster or point of purchase display message is to make rigid the thin item by attaching it to a thicker substrate and preserving its smooth appearance. Air bubbles (entrapped air), coating ridges, and mottling on the surface caused by excessive heat (even temperatures as low as 160 F can cause this mottling) will and can be seen on almost every item mounted with these PVA ridged coated boards. All smooth coated industry boards have a tendency to trap air between the base board and the mounting item when used in a mechanical platen press or a heat vacuumed press. In order for adhesive boards to work in these two pieces of equipment the manufacturers use texture in the coating, creating ridges for air to exit the board/mounted item interface during the mounting process. However this texture is highly visible and a major negative factor on overall appearance. It must be noted that this adhesive coating texture does not melt during mounting and thus remains intact in the finished job. The new heat activated board has a regular pattern of a multiplicity of micro perforations through the release cover sheet, the adhesive, and the clay coating on the base or facing paper and going into or through the base paper to achieve a high degree of porosity and a way for air to travel through the non porous adhesive layer and the low-porosity clay coating of the facing sheet without affecting the appearance of the mounted display item.

These micro perforations are made in line during the manufacturing of the boards with a cold needle roll with sharp pins approximately 0.024 in. diameter with a sharp point leaving a 0.005 in. hole into the adhesive/paper board surface.

Conventional boards that are extrusion coated with a heat activating adhesive tend to be smooth however they either have high activation temperatures with fair hot tack or lower activation temperatures with no hot tack as outlined in the previous section.

The new board provides a smooth adhesive surface and can be activated at 130 F, a temperature that will not affect the appearance of the job or any of the materials used in the process. As an example, the clay coating on a typical Tango facing paper would have a Sheffield smoothness value in the range of about 10-40, whereas an uncoated paper would range from about 40-225. The texturing for air management on a conventional PVA heat activated coating on foam board would be so rough in comparison, that the Sheffield scale would not be considered applicable. In contrast, the exposed adhesive surface of the inventive board would have smoothness in the range of about 100-200, and can be controlled at least in part by the smoothness of the release liner, which is typically about 150.

Dirt and particulates are a major concern when using these products in the shop, industrial or picture framing environments preparing them for sale to customers for final display. These environments are not clean and many jobs have picked up something due to static or having an exposed surface that in some cases has a slight tack to it. Most boards are boxed to the customers who mount items on them with no cover sheets protecting the adhesive or loose non attached wrinkled release tissues that float around in the box of perhaps 25 sheets at 3/16 inch in total thickness with adhesive on one side of the boards. One not trained in the art of mounting can easily see the above packaging methods are designed for failure. The new board has a glass smooth (not wrinkled) liner attached and in intimate contact to the ultra low temperature adhesive on every sheet. No dirt or dust can settle on or get at the surface of the adhesive. One peels away the release liner only when it is time to send the board through the mounting equipment. This equipment area is the cleanest of the areas the board will see when compared to storage areas and even their original corrugated shipping boxes. The real problem is that the dirt and contaminate particles that cause the surface imperfections in the final product (as they are sandwiched between the top mounted item and the adhesive layer) are so small that they cannot be seen by the naked eye until it is too late and they show up as bumps on the final surface, appearing many times larger than their actual size.

(5) Hot Roll Transfer

This consideration relates to the melting and undesirable transfer of the hot adhesive to a hot laminator silicone roll or the platen of a mechanical or vacuum press used in the mounting and laminating industry. Cleanup is required and in any event can result in ruined jobs. When a job is ruined it is not the cost of the adhesive board but the much higher cost of the mounting item (photograph, expensive poster or print) that is ruined. If a heat activated board adhesive transfers to the roll on a roll laminator that product will have poor market acceptance in the very large segment that uses hot roll laminators. The dilemma is the lower the activation temperature of the adhesive the greater chance it will transfer to the hot roll. The industry is calling for lower and lower temperature activation boards not only from a safety (fire hazard, operator burns, less out gassing/cleaner air) perspective but for all the reasons stated above on temperature and its impact on the product.

The new board is the first product that can achieve a permanent bond with no risk of delimitation during its useful life at a totally unexpected low temperature activation of 130 F with no roll transfer.

(6) Universal Adhesion

There are many mounting boards in this industry and some are high temperature activating, some are lower activating, some are smooth, some are textured, some transfer to a hot roll, some do not, some take considerable time to achieve a bond and some are faster, some have permanent adhesive bonds to the mounting items and others have poor or removable bonds, some have adhesion to photos and others do not adhere to photos or ink jet papers. There has never been one product that has ultra low temperature activation, glass like smoothness, no transfer to a hot roll or platen, much faster in speed and productivity, and an adhesive that bonds permanently to all mounting items (photos, ink jet papers, posters, films) until this novel adhesive coated board was invented.

(7) Bubble Test

This lab test demonstrated the effectiveness of adding porosity to the foam board composite surface with a series of equally spaced perforation holes using a cold needle roll to go into the top sheet of the foam board base paper passing thru the 50 lb. release paper cover sheet and the dried and coated heat activated adhesive layer and the clay coating covering the 10 pt. base paper. It appears that ½ inch on center spacing with a needle with a wire diameter of 0.025 and a tapered point is good at giving the needed porosity to the board product so as to resolve the air entrapment problem when mounting non porous items in a flat heat press or mechanical platen press used in the framing and art markets. A non-perforated adhesive coated foam board and a perforated adhesive coated foam board (approximately 12×12 inch) with the adhesive facing up receive a 6×6 inch piece of 2 mil polyester decal material. An aggressive PSA adhesive was used on the surfaces of the two heat activated adhesive boards. The edges of the decal were burnished down to trap air under the decal creating a center bubble of two inches in diameter. The two test pieces (one perforated, one not) were placed in a cold platen press for 10 seconds with a pressure of 10-20 psi. Upon opening the press, the bubble areas were inspected. The perforated sheet and board of this invention had no sign of a bubble whereas the non perforated board had the same bubble as when it was put into the press. This test clearly shows that cold needle perforation works to solve the problem of air entrapment so common with the use of flat heated mounting presses and non-porous materials.

The perforations entirely penetrate the adhesive coating with an effective diameter in the range of about 0.005-0.010 in. and pass into the board facing. The perforations can most easily be achieved with a pin roller, in a regular pattern with center-to center pitch in the range of about 0.100 to 1.00 inch.

(8) Comparison Tests

The preferred new foam board with three-component adhesive and perforations was compared with the commonly-used Elmers Single Step foam board and the Gilman Low temp foam board, on a Titan roll laminator, with the following results.

| BOARD | TEMP (F.) | SPEED | ADHESION |
|---|---|---|---|
| INVENTION | 200 | 5 | GOOD ON ALL MATERIALS |
| ELMERS | 200 | 5 | FAILED ON ALL MATERIALS |
| ELMERS | 200 | 3 | GOOD ON PAPER ONLY; FAILED ON RC PHOTOPAPERS; FAILED ON INK JET PHOTOPAPERS |
| INVENTION | 250 | 5 | VERY GOOD ON ALL MATERIALS |
| ELMERS | 250 | 5 | FAILED ON ALL MATERIALS |
| GILMAN | 250 | 2 | GOOD TO FAIR ON ALL MATERIALS |

BRIEF DESCRIPTION OF THE DRAWING

Aspects of the disclosure are shown in the accompanying drawing, in which.

DETAILED DESCRIPTION (1) Adhesive

Figure 1:
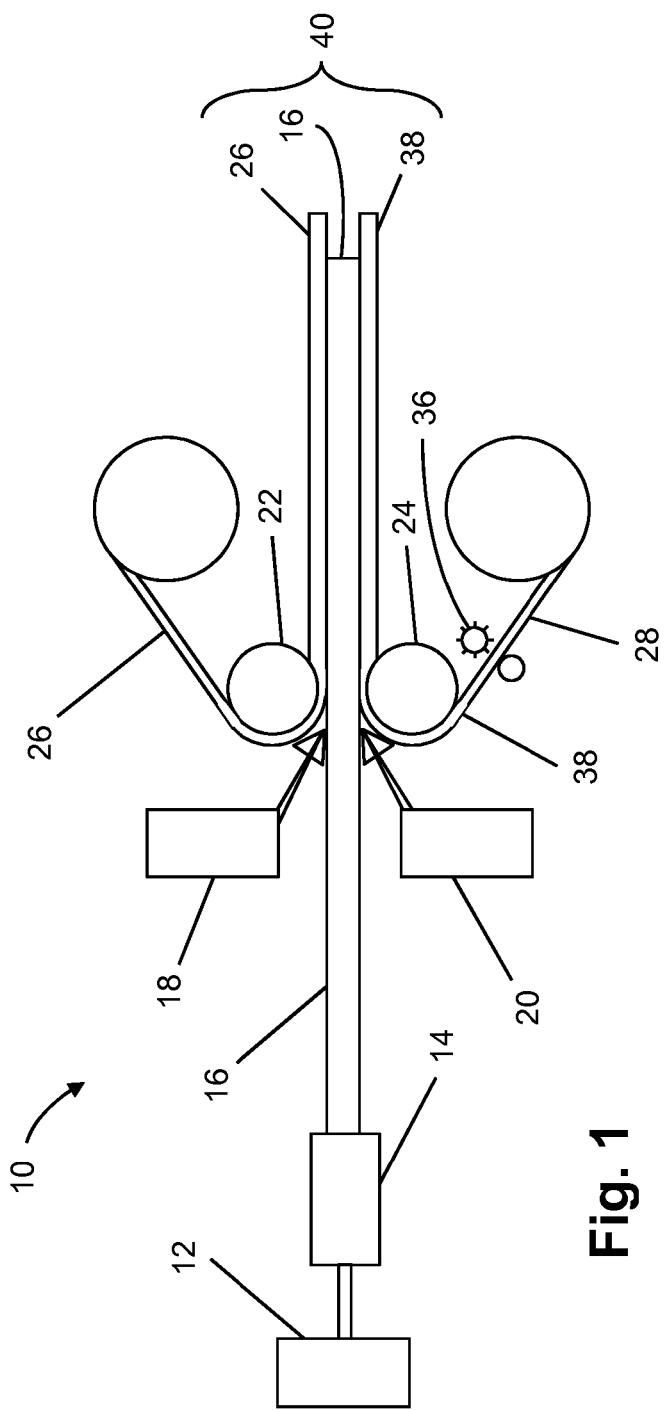
FIG. 1 is a schematic representation of a manufacturing process for a foam board according to one embodiment.

An adhesive comprising a mixture of polyvinyl acetate ethylene (VAE) emulsion and polyurethane dispersions (PUD) can provide the advantages described above. The preferred adhesive composition consists essentially of the dried aqueous coating of polyvinyl acetate ethylene emulsion (VAE) as the primary constituent with aliphatic urethane dispersion (PUD), and polyurethane dispersion (PUD) as secondary constituents. The preferred dry adhesive coating thickness is in the range of 0.5 to 1.0 mil.

Although urethane based adhesives may be three times the cost of other adhesives (PVA and VAE), they have very special adhesive properties and are used in the most demanding applications. The high strength elastomeric properties of urethane adhesives provide a much greater ability to adhere two surfaces together when relying on mostly mechanical bonding as in these mounting applications with non porous coated papers and no ability to use cross linkers in the adhesives to achieve more of a chemical bond.

Polyvinyl resins (PVA adhesives) alone have been used in the prior art for heat activated adhesive foam boards. These adhesives have good adhesion to porous paper materials, poor adhesion to non porous materials and a relatively high melt point. Because they do not melt or flow with the temperatures used in the mounting process 165 F-250 F they will not transfer to a hot laminator rubber roll (a critical requirement in the commercial graphics market); however they have poor adhesion to many non porous coated papers used in the photographic and ink jet print display markets. Their activation temperature is also high (e.g., above 150 F, such as 175 F) and may tend to add unwanted artifacts to the delicate paper printed surfaces and or base foam dimensional stability. These adhesives are very cost effective and are used in white glues, wood glues, corrugated and packaging applications, book binding and industrial application.

The preferred adhesive has a first component having first tack at room temperature, a heat activation temperature above 150 F, and a melt temperature above about 250 F; a second component having second tack greater than the first tack at room temperature, an activation temperature below 150 F and elastomeric adhesion to surfaces such as resin coated (non-porous) paper, plastic film and/or other surfaces having low surface energy; and a third component having an activation temperature below 130 F, preferably about 120 F and most preferably about 110 F, a high rate of crystallization when heated above the activation temperature and dried to room temperature, and that when dried produces a non-tacky matte surface.

As an example, the primary constituent could have an activation temperature of over 175 F, i.e., 200 F, and a melt point above 250 F. In order to lower the melt point and also to improve the adhesion to non-porous coated papers the secondary constituents are added. One is preferably a very tacky, soft, low melt aqueous urethane dispersion with excellent adhesion to non porous coated papers. However this might be too tacky to be used alone and could transfer to a hot rubber roll. The industry does not want a mounting board to have any tack and prefers a dry, non tacky surface that will not block to other items it may inadvertently come into contact with. It must be noted that tack is the reason why there has been poor acceptance of pressure sensitive coated boards in these industries due to the risk of a large exposed surface that must not come into contact with anything until it goes through a laminator, so the tacky adhesive is covered up and protected. A third constituent can be a very low melt, aggressive, tough adhesive that by itself would transfer to a roll. However it should have a very high rate of crystallization once heated and cooled and also dry to a very non tacky matte surface. These properties help balance the tackiness of the other two components.

In the preferred embodiment the activation temperatures for adhesive bonding are (i) 200 F for the VAE (becomes tacky but does not melt at that temperature and will not transfer to roll at 250 F); (ii) 150 F for one PUD (and alone would transfer to a roll above 150 F); and (iii) 130 F for another PUD (and alone would transfer to a roll above 130 F). Although the VAE is tacky at room temperature, it does not melt at a low enough temperature relative to the roll temperature and with a high viscosity when heated (low melt index), it does not flow and transfer to the roll. Further, it is believed that with at least 50% VAE and no more than 50% total of the low melt, tacky PUDs, the PUD's are restrained from transferring to the roll.

The combination of these three components achieves strong adhesion for all display items, including those having very smooth surfaces, with the added benefits of very low activation temperature (110-130 F) and non transfer to the rubber rolls of the laminators. Moreover, the adhesive can permanently bond display items to any conventional rigid or flexible, porous or non-porous graphics substrate, such as paper, plastic, glass, wood, metal, cloth or other fabric, when subjected to activation temperature in the range 110-130 F.

(2) The Process

Figure 2:
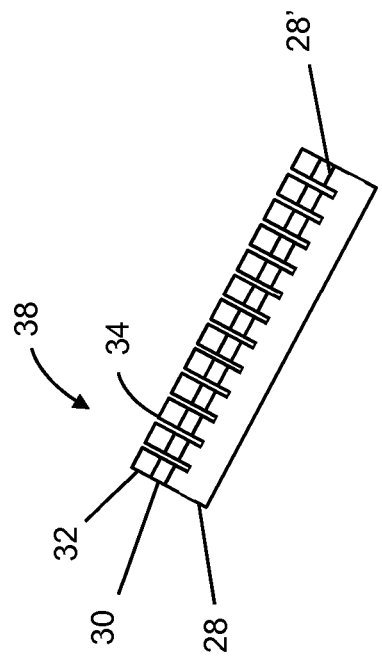
FIG. 2 is an enlarged schematic detail of a portion of FIG. 1.

One process 10 is shown schematically in the accompanying FIGS. 1 and 2. The process begins with polystyrene pellets 12 melted in extruder 14 and pushed through a die to produce a flat sheet of open and closed cell, low density foam 16 with a thickness of ⅛ inch to ½ inch and a width of 40-62 inches. Adhesive applicators 18, 20 and rollers 22, 24 laminate 10-18 point facing paper 26, 28 to both sides of the foam web 16. The mounting side 28' of the paper 28 that will receive the display item is coated with the preferred three-component adhesive 30, and a release paper 32 applied. As also shown in FIG. 2, the adhesive coated paper 28 with release liner 32 is delivered to the roller 24 of FIG. 1. In addition, the mounting side 28' of adhesive coated paper with release liner attached is perforated 34 by a perforation roll 36 with backup roll prior to being laminated as a composite layer 38 to the foam board 16. Perforation rolls are available from Stewarts of America, Inc. The resulting composite web 40 of liner 32, heat activated adhesive 30, paper 28, foam 16, and paper 26 is slit to size and boxed at the end of the line to complete the preferred ultra low temperature adhesive coated mounting board.

It should be understood that the important result is that the perforations 34 penetrate entirely through the adhesive coating 30 and into the paper 28 (i.e., fully or partially). It is a matter of manufacturing convenience whether the perforations are made before or after the liner is applied onto the adhesive layer. In the Figures, the perforations are made with a dense, regular pattern of pins on a roll, but a similar pattern can be made with laser beams.

Accordingly, one process for producing a heat activated foam board including a base board and a facing surface on the mounting side, to which a display item is to be mounted, comprises in any order: adhering a mounting adhesive layer 30 to the facing surface 28'; perforating 34 the mounting adhesive layer 30 into the facing surface 28' to form a conditioned facing surface; and applying a release liner 32 onto the mounting adhesive layer. Generally, the facing surface would be a paper or plastic layer on the base board 16, but it is possible that some base board materials may not need an applied facing, but instead exhibit all or most desirable surface properties of conventional foam board including mild porosity.

Paper or other porous facing is preferable if the finished mounting board is to be used for mounting non-porous graphics items, so that trapped air is dispersed through the perforated adhesive and paper facing during lamination. Mounting boards with non-porous (e.g., plastic) facing, carrying the inventive adhesive coating with or without perforations, can still provide significant advantages for mounting porous graphics items at the high levels of throughput achievable with the low temperature (110-130 F) bonding characteristics of such adhesive. Accordingly, it should also be understood that in some embodiments the facing on the mounting surface of the base board need not be a distinct layer or component.

End Use

Figure 3:
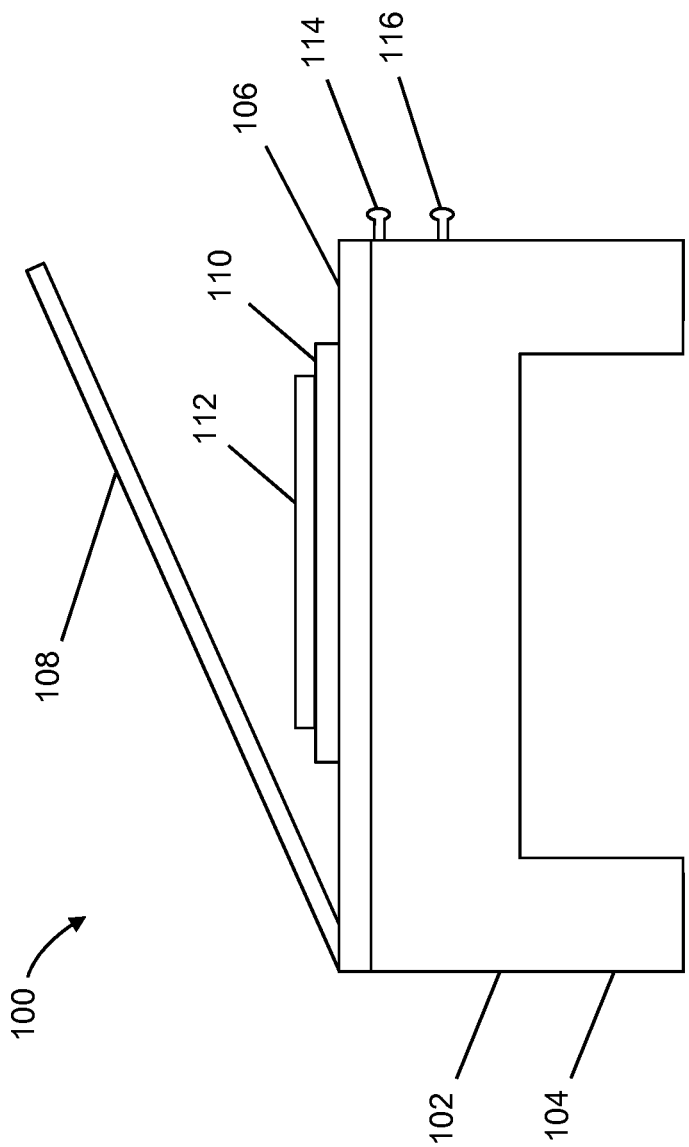
FIG. 3 is a schematic of a graphic display item positioned on a mounting board, ready to be bonded together in a press laminator.

FIG. 3 is a schematic of a mechanical vacuum press laminator 100 including a base 102 supported by legs 104 and supporting a heated vacuum platen 106. A heated cover or top plate 108 is displaceable toward the platen 106, whereby a mounting board 110 that embodies an aspect of the present invention, carries a graphics item 112 to be bonded to the mounting board. While the mounting board 110 with graphic 112 is pressed between the platen 106 and the press plate 108, the temperature of the heat applied is set by controller such as by dial 114 or other input device and the vacuum set by dial 116. In this manner, the bonding can be achieved at the remarkably low temperature described above. Analogous functional components are found on a roll laminator.

The invention claimed is:

1. An adhesive coated mounting board, wherein the adhesive is heat activatable and comprises a mixture of polyvinyl acetate ethylene (VAE) emulsion and polyurethane dispersions (PUD), wherein the adhesive coating is carried on a mounting surface of a paper or plastic facing on a foam board and the adhesive coating is covered by a release liner.

2. The mounting board of claim 1, wherein the adhesive is activatable at any temperature setting in the range of about 110-130 F in a roll or press laminator to permanently bond a display item to said board.

3. The mounting board of claim 2, wherein the adhesive coating has a smooth surface against the releaser liner and perforations in the size of 0.005-0.010 in. effective diameter pass through the adhesive coating and into the facing.

4. The mounting board of claim 3, wherein upon removal of the release liner the adhesive coating has a smooth exposed surface in the range of about 100-200 Sheffield units.

5. The mounting board of claim 4, wherein the facing is a paper having a coated mounting surface.

6. The mounting board of claim 1, wherein
the adhesive coating has a bottom surface adhered to a mounting surface of the mounting board and an upper surface having a smoothness in the range of about 100-200 Sheffield units;
the adhesive comprises one VAE constituent and two PUD constituents;
the weight percent of the VAE constituent is greater than the weight percent of each of the PUD constituents;
the adhesive is activatable at any temperature in the range of about 110-130 F; and
a multiplicity of perforations in the effective diameter range of 0.005-0.010 in. pass through the adhesive coating and into the mounting surface of the mounting board.

7. The mounting board of claim 1, comprising a regular pattern of a multiplicity of perforations passing entirely through the adhesive coating.

8. The mounting board of claim 7, wherein the perforations have an effective diameter in the range of 0.005-0.010 in.

9. The mounting board of claim 8, wherein the perforations are distributed with center-to-center spacing in the range of about 0.100 to 1.00 inch.

10. The mounting board of claim 1, wherein the adhesive consists essentially of:
a first component having first tack at room temperature, a heat activation temperature above 150 F, and a melt temperature above about 250 F;
a second component having second tack at room temperature greater than the first tack, an activation temperature below 150 F and an elastomeric adhesion to materials having low surface energy; and
a third component having an activation temperature below 130 F, a high rate of crystallization when heated above the activation temperature and dried to room temperature, and that when dried produces a non-tacky matte surface.

11. The mounting board of claim 1, wherein the adhesive consists essentially of:
a first component having first tack at room temperature, a heat activation temperature above 150 F, and a melt temperature above about 250 F;
a second component having second tack at room temperature greater than the first tack, an activation temperature below 150 F and an elastomeric adhesion to resin coated paper; and
a third component having an activation temperature below 130 F, a high rate of crystallization when heated above the activation temperature and dried to room temperature, and that when dried produces a non-tacky matte surface.

12. The mounting board of claim 1, wherein the adhesive consists essentially of:
a first component having first tack at room temperature, a heat activation temperature above 150 F, and a melt temperature above about 250 F;
a second component having second tack at room temperature greater than the first tack, an activation temperature below 150 F and an elastomeric adhesion to plastic film; and
a third component having an activation temperature below 130 F, a high rate of crystallization when heated above the activation temperature and dried to room temperature, and that when dried produces a non-tacky matte surface.

13. The mounting board of claim 10, wherein the first component is a polyvinyl acetate ethylene (VAE) emulsion and the second and third components are polyurethane dispersions (PUD).

14. The mounting board of claim 11, wherein the first component is a polyvinyl acetate ethylene (VAE) emulsion and the second and third components are polyurethane dispersions (PUD).

15. The mounting board of claim 12, wherein the first component is a polyvinyl acetate ethylene (VAE) emulsion and the second and third components are polyurethane dispersions (PUD).

* * * * *